(12) United States Patent
Tsutsumi et al.

(10) Patent No.: US 8,403,644 B2
(45) Date of Patent: Mar. 26, 2013

(54) POWER GENERATING APPARATUS OF RENEWABLE ENERGY TYPE

(75) Inventors: Kazuhisa Tsutsumi, Tokyo (JP); Takuro Kameda, Tokyo (JP); Taku Ichiryuu, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/161,822

(22) Filed: Jun. 16, 2011

(65) Prior Publication Data

US 2012/0063898 A1 Mar. 15, 2012

Related U.S. Application Data

(63) Continuation of application No. PCT/JP2011/058647, filed on Apr. 5, 2011.

(51) Int. Cl.
*F03D 9/00* (2006.01)
*F03D 9/02* (2006.01)

(52) U.S. Cl. ....... 416/171; 415/4.3; 415/4.5; 415/168.2; 60/413; 60/455; 290/44; 290/55

(58) Field of Classification Search .............. 60/413, 60/455; 290/44, 55; 415/4.3, 4.5, 168.2; 416/171
See application file for complete search history.

(56) References Cited

U.S. PATENT DOCUMENTS

| | | | | |
|---|---|---|---|---|
| 2,706,255 A | * | 4/1955 | Breaux et al. | 290/4 D |
| 3,030,118 A | * | 4/1962 | Groce | 277/563 |
| 3,547,556 A | * | 12/1970 | Keene | 416/110 |
| 3,943,717 A | * | 3/1976 | Schexnayder | 60/453 |
| 7,183,664 B2 | | 2/2007 | McClintic | |
| 7,436,086 B2 | | 10/2008 | McClintic | |
| 7,569,943 B2 | | 8/2009 | Kovach et al. | |
| 7,656,055 B2 | | 2/2010 | Torres et al. | |
| 2009/0129953 A1 | * | 5/2009 | Andersen | 417/334 |
| 2010/0032959 A1 | | 2/2010 | Nies | |
| 2011/0109094 A1 | * | 5/2011 | Kenway et al. | 290/55 |

FOREIGN PATENT DOCUMENTS

| | | |
|---|---|---|
| JP | 5928136 A | 8/1984 |
| JP | 61212674 A | 9/1986 |
| JP | 2002213842 A | 7/2002 |
| JP | 3118509 U | 1/2006 |
| JP | 2009-503339 | 1/2009 |

(Continued)

OTHER PUBLICATIONS

International Search Report for PCT/JP2011/058647, dated Jul. 19, 2011.

*Primary Examiner* — Igor Kershteyn
(74) *Attorney, Agent, or Firm* — Kanesaka Berner & Partners, LLP (57) ABSTRACT

A power generating apparatus of renewable energy type in which a hydraulic pipe between a hydraulic pump installed inside a nacelle and a hydraulic motor installed near a bottom part of a tower can handle the turning motion of the nacelle. In the power generating apparatus of renewable energy type, a hydraulic pump inside the nacelle and a hydraulic motor near a base end part of a tower are connected by a first double pipe and a second double pipe. The first double pipe is rotatably connected to the second double pipe. The first double pipe includes a first inner pipe and a first outer pipe. The second double pipe includes a second inner pipe and a second outer pipe. The first and second inner pipes communicate with each other to form an inner passage. The first and second outer pipes communicate with each other to form an outer passage.

19 Claims, 6 Drawing Sheets

FOREIGN PATENT DOCUMENTS

| | | |
|---|---|---|
| JP | 2009162305 A | 7/2009 |
| WO | WO2009058022 | 5/2009 |
| WO | WO2009061209 | 5/2009 |
| WO | WO 2009061209 A1 * | 5/2009 |
| WO | WO2009064192 | 5/2009 |
| WO | WO 2009064192 A1 * | 5/2009 |

* cited by examiner

POWER GENERATING APPARATUS OF RENEWABLE ENERGY TYPE

TECHNICAL FIELD

The present invention relates to a power generating apparatus of renewable-energy type which transmits rotation energy of a rotor to a generator via a hydraulic transmission which is a combination of a hydraulic pump and a hydraulic motor. The power generating apparatus of renewable-energy type uses renewable energy such as wind, tidal current, ocean current and river current to generate power. There are, for instance, a wind turbine generating apparatus, a tidal current generating apparatus, an ocean current generating apparatus, a river current power generating apparatus and the like.

BACKGROUND ART

Recently, from the perspective of environmental protection, a wind turbine generator using wind power and other wind turbine generator using renewable energy such as tidal current, ocean current and river current are becoming popular. In the renewable-energy type power generating apparatus, motion energy of wind, tidal current, ocean current or river current is converted to rotation energy of the rotor and the rotation energy is converted to electric power by a generator.

This type of power generating apparatus requires a step-up gear between the rotor and the generator as the rotation speed of the rotor is smaller than the rated rotation speed of the generator. Specifically, the rotation speed of the rotor is increased by the step-up gear to the rated rotation speed of the generator and then inputted to the generator.

To improve power generation efficiency, the power generating apparatus of renewable energy type becomes larger to improve power generation efficiency and the step-up gear becomes heavier and more expensive as well. In view of this, a power generating apparatus of renewable energy type which uses hydraulic transmission having a hydraulic pump and a hydraulic motor instead of the mechanical step-up gear, receives increased attention.

For instance, Patent Literature 1 proposes a wind turbine generating apparatus which transmits rotation energy of the rotor to a generator via a hydraulic transmission.

With the use of the hydraulic transmission in which the hydraulic pump and the hydraulic motor are connecting by hydraulic piping, the freedom of arranging the transmission mechanism for transmitting rotation energy of the rotor to the generator is significantly improved. Thus, unlike a conventional wind power generating apparatus, it is not necessary to arrange all the transmission mechanisms within the nacelle installed atop the tower and it is possible to arrange the hydraulic motor and the generator connected to the hydraulic motor at ground level or seal level. This reduces load supported by the tower and reduces an installation cost of the wind power generating apparatus. In addition, it is easier to perform the maintenance of the hydraulic motor and the generator.

For instance, Patent Documents 2 through 5 disclose the wind power generating apparatus in which the hydraulic motor and the generator are arranged at ground level.

However, a general wind power generating apparatus rotates the nacelle depending on a wind direction in view of improving the power generation efficiency. Thus, whether the hydraulic motor and the generator are arranged at ground level or seal level, it is desired to design the wind power generating device capable of turning the nacelle.

Patent Literature 6 discloses a wind power generating apparatus in which the hydraulic motor installed at a bottom of the tower turns around a vertical shaft with the nacelle.

Figure 7:
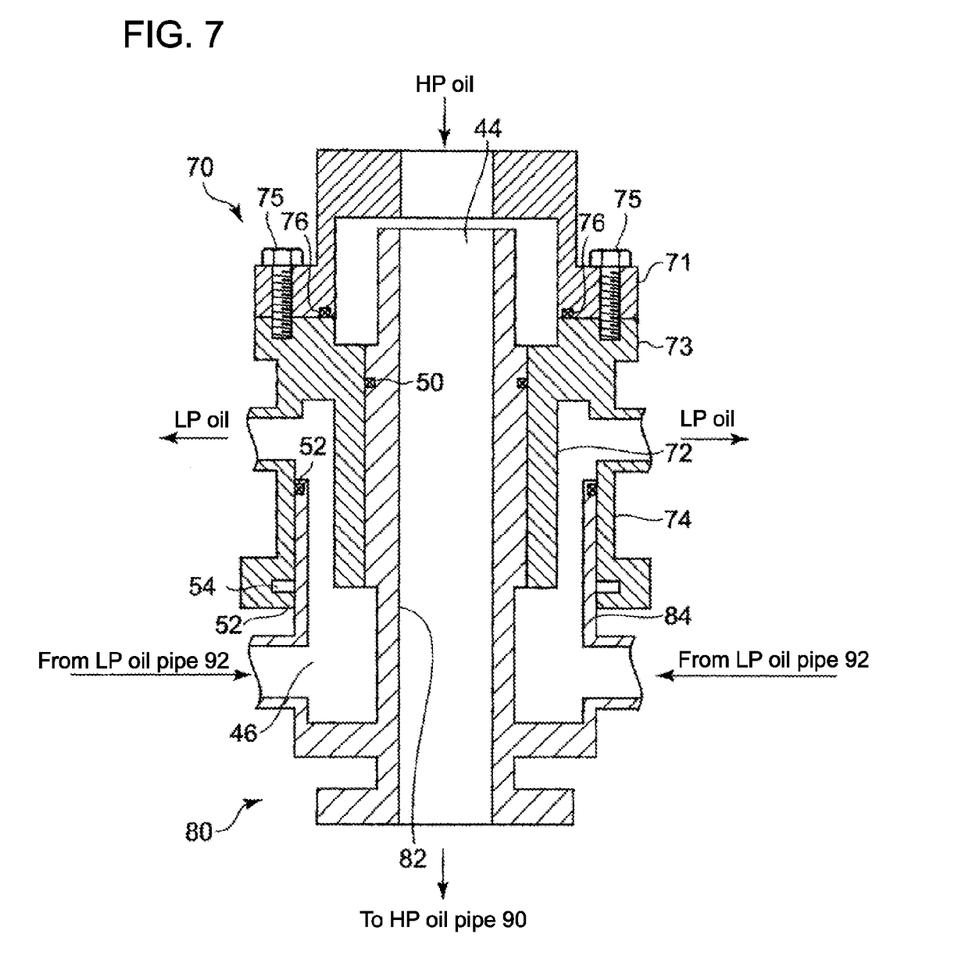
FIG. 7 is a sectional view showing a detailed structure of the first and second double pipes, different from the structure of FIG. 6.

Patent Literatures 7 and 8 discloses a wind power generating apparatus in which a part of the hydraulic piping (a high-pressure oil passage and a low-pressure oil passage) connecting the hydraulic pump installed in the nacelle and the hydraulic motor installed at the bottom of the tower turns with the nacelle. In the wind power generating apparatus of Patent Literature 6, a hydraulic swivel arranged at a nacelle bottom turns the hydraulic piping on the nacelle side with the nacelle (as shown in FIG. 7 of Patent Literature 7 and FIG. 7 of Patent Literature 8). The hydraulic swivel consists of an outer part and an inner part which are rotatable relative to each other. The piping provided in the inner part is in communication with a loop passage provided at an inner periphery of the outer part.

CITATION LIST

Patent Literature

[PTL 1]
US 2010/0032959A
[PTL 2]
U.S. Pat. No. 7,656,055B
[PTL 3]
U.S. Pat. No. 7,569,943B
[PTL 4]
U.S. Pat. No. 7,436,086B
[PTL 5]
U.S. Pat. No. 7,183,664B
[PTL 6]
WO 2009/064192A
[PTL 7]
WO 2009/061209A
[PTL 8]
WO 2009/058022A

SUMMARY OF INVENTION

Technical Problem

Patent Literature 6 does not disclose a detailed structure of a hydraulic pipe that connects the hydraulic pump installed in the nacelle and the hydraulic motor installed at a bottom part of the tower.

Patent Literatures 7 and 8 discloses a hydraulic swivel for turning the hydraulic pipe on the nacelle side with the nacelle. However, there is no detail description as to a connection part where the pipe provided on the inner part and the loop passage provided on the outer part are connected and thus, the detailed structure of the hydraulic swivel is not sufficiently disclosed.

It has been desired to construct such a hydraulic pipe connecting the hydraulic pump in the nacelle and the hydraulic motor near the bottom of the tower that can handle the turning motion of the nacelle.

At the same time, in the power generating apparatus of renewable energy type besides the wind turbine generator, there is need to configure the hydraulic pipe that can handle the turning motion of the nacelle (the main shaft and a housing chamber of the hydraulic pump).

In view of the above problems, it is an object of the present invention is to provide a power generating apparatus of renewable energy type in which a hydraulic pipe between a hydraulic pump installed inside a nacelle and a hydraulic motor installed near a bottom part of a tower can handle the turning motion of the nacelle.

Solution to Problem

A power generating apparatus of renewable energy type in relation to the present invention, may include, but is not limited to: a tower; a nacelle which is installed on a tip end part of the tower; a main shaft which is housed in the nacelle and rotates with rotor blades; a hydraulic pump which is housed in the nacelle and installed to the main shaft; a hydraulic motor which is arranged near a base end part of the tower and is driven by pressurized oil supplied from the hydraulic pump; a generator which is connected to the hydraulic motor; a first double pipe; and a second double pipe. The first double pipe includes a first inner pipe and a first outer pipe and is supported on a side of the nacelle and extends inside the tower toward the base end part of the tower. The first inner pipe and the first outer pipe are connected to the hydraulic pump. The second double pipe includes a second inner pipe and a second outer pipe and is arranged farther from the nacelle than the first double pipe and fit in the first double pipe. The second inner pipe and the second outer pipe are connected to the hydraulic motor. The first and second inner pipes communicate with each other to form an inner passage. The first and second outer pipes communicate with each other to form an outer passage. High-pressure oil discharged from the hydraulic pump flows in one of the inner passage and the outer passage and is supplied to the hydraulic motor, whereas low-pressure oil discharged from the hydraulic motor flows in the other of the inner passage and the outer passage and returns to the hydraulic pump. The first double pipe supported on the nacelle side is connected rotatably to the second double pipe.

In such power generating apparatus of renewable energy type, the first and second inner pipes communicate with each other to form the inner passage, whereas The first and second outer pipes communicate with each other to form the outer passage. The high-pressure oil flows in one of the inner passage and the outer passage and the low-pressure oil flows in the other of the inner passage and the outer passage.

The first double pipe supported to the nacelle side is connected rotatably to the second double pipe so that, even when the nacelle turns, the high-pressure oil and the low-pressure oil can flow between the hydraulic pump inside the nacelle and the hydraulic motor installed on the base end part of the tower via the first and second double pipes.

In the above power generating apparatus of renewable energy type, the first inner pipe and the first outer pipe may be joined together at an end on a side nearer to the nacelle and be integrated to form the first double pipe.

In this manner, the first and second inner pipes are joined to form the first double pipe at the end on the side hearer to the nacelle, thereby requiring only the first outer pipe out of the first inner and outer pipes to be supported on the nacelle side.

In the above power generating apparatus of renewable energy type, preferably the high-pressure oil flows in the inner passage and the low-pressure oil flows in the outer passage.

In this manner, the high-pressure oil flows in the inner passage and the low-pressure oil flows in the outer passage so that, even when the high-pressure oil of the inner passage leaks due to corrosion or breakage of the inner passage, the leaked high-pressure oil is captured in the outer passage. Thus, it is possible to prevent outside leakage of the high-pressure oil.

In such case, the power generating apparatus of renewable energy type may further include an inner seal which seals a gap between a pipe wall surface of the first inner pipe and a pipe wall surface of the second inner pipe. Preferably, the inner seal is arranged so as to be interposed between the inner passage and the outer passage.

In this manner, the inner seal is provided between the inner passage and the outer passage and seals the gap between the pipe wall surface of the first inner pipe and the pipe wall surface of the second inner pipe. Therefore, even when the inner seal functions poorly, the high-pressure oil flowing in the inner passage leaks to the outer passage, thereby preventing the outside leakage of the high-pressure oil.

In the case above, the power generating apparatus of renewable energy type may also include a pair of outer seals which seal a gap between a pipe wall surface of the first outer pipe and a pipe wall surface of the second outer pipe, an oil storage part which is in communication with a space between the pair of outer seals; and a tank which is in communication with the oil storage part.

This allows the low-pressure oil leaking from the outer passage to flow into the atmospheric pressure tank via the oil storage part even when the outer seal functions poorly. Specifically, the low-pressure oil leaked from the outer passage is recovered by the tank once the pressure is sufficiently reduced, thereby preventing outside leakage of the low-pressure oil.

In the above power generating apparatus of renewable energy type, preferably the first double pipe extends approximately over the entire length of the tower from the nacelle side to the base end part of the tower, and the second double pipe is supported near the base end part of the tower.

In this manner, the first double pipe extending from the nacelle side to the base end part of the tower is used so that the hydraulic pipe can be consistently configured by the double pipe approximately over the entire length of the tower. Thus, it is possible to reduce the space inside the tower for installing the hydraulic pipe.

In such case, the second double pipe may be shaped into a container with a closed bottom and installed on a base where the tower is installed upright.

In this manner, the second double pipe connected to the first double pipe is shaped into a container with a closed bottom and the tower is installed upright on the base and thus, a supporting structure specially for supporting the second double pipe is no longer needed.

In the above case, the first double pipe may be rotatably fit to the second double pipe, and the first and second inner pipes may be slidable relative to each other in a longitudinal direction of the first and second inner pipes and the first and second outer pipes may be slidable relative to each other in a longitudinal direction of the first and second outer pipes.

In this manner, the first double pipe is fitted to the second double pipe so that the first inner pipe is slidable relative to the second inner pipe and the first outer pipe is slidable relative to the second outer pipe. Therefore, the longitudinal movement of the first double pipe relative to the second double pipe is allowed, thereby absorbing thermal expansion of the first and second double pipes due to oil temperature rise in the first and second double pipes or the like.

As the first double pipe is allowed to move relative to the second double pipe in the longitudinal direction, the high-pressure oil and the low-pressure oil in the inner and outer passages causes hydraulic thrust in the direction to push the first double pipe toward the nacelle side. As a result, it is possible to reduce the load on the nacelle that has increased by supporting the first double pipe on the nacelle side, thereby reducing the load on the tower for the corresponding amount.

In the above case, the power generating apparatus of renewable energy type may also include a supporting member which is fixed to an inner periphery of the tower and is in contact with an outer periphery of the first outer pipe of the first double pipe from outside in a radial direction of the first double pipe. The supporting member may support the first double pipe rotatably and slidably in the longitudinal direction.

In this manner, the supporting member is fixed to the inner periphery of the tower in contact with the outer periphery of the first outer pipe from outside in the radial direction of the first outer pipe and the supporting member supports the first double pipe rotatably and slidably in the longitudinal direction. Thus, the first double pipe can be firmly supported without interfering with the rotation of the first double pipe caused by the rotation of the nacelle while absorbing thermal expansion of the first and second double pipe due to the oil temperature rise or the like.

In the above case, the power generating apparatus of renewable energy type may also include an inner bearing which is provided between the first inner pipe and the second inner pipe and supports the first inner pipe rotatably to the second inner pipe, and an outer bearing which is provided between the first outer pipe and the second outer pipe and supports the first outer pipe rotatably to the second outer pipe. The inner bearing may be slidable relative to the first inner pipe in a longitudinal direction of the first inner pipe, and the outer bearing may be slidable relative to the first outer pipe in a longitudinal direction of the first outer pipe.

In this manner, the inner bearing is provided between the first inner pipe, the second inner pipe and the outer bearing is provided between the first outer pipe and the second outer pipe, the inner bearing is slidable relative to the first inner pipe and the outer bearing is slidable relative to the first outer pipe in the longitudinal direction. This allows the first double pipe to move relative to the second double pipe in the longitudinal direction, thereby absorbing thermal expansion of each of the first and second double pipes.

As the first double pipe is allowed to move relative to the second double pipe in the longitudinal direction, the high-pressure oil and the low-pressure oil in the inner and outer passages causes hydraulic thrust in the direction to push the first double pipe toward the nacelle side. As a result, it is possible to reduce the load on the nacelle that has increased by supporting the first double pipe on the nacelle side, thereby reducing the load on the tower for the corresponding amount.

Alternative, in the power generating apparatus of renewable energy type, the first double pipe may extend partway through the tower from the nacelle side, and the second double pipe may be supported to the tower.

In this manner, the first double pipe extending partway through the tower from the nacelle side is used so that the hydraulic pipe can be configured by a double pipe structure in a desired range inside the tower.

In such case, the power generating apparatus of renewable energy type may further include a thrust bearing which supports the first double pipe rotatably to the second double pipe and receives a thrust load along the longitudinal direction of the first and second double pipes.

In this manner, the thrust bearing supports the first double pipe rotatably to the second double pipe so as not to prevent the turning of the first double pipe caused by the rotation of the nacelle. Further, the thrust bearing can positively receive the hydraulic thrust generated by the weight of the first double pipe and the high-pressure oil and the low-pressure oil flowing in the inner and outer passages.

The thrust bearing may be a tapered roller bearing which receives a radial load along a radial direction of the first and second double pipes in addition to the thrust load.

Alternatively, the first and second double pipes may be fit to each other such that the first and second inner pipes are slidable relative to each other in a longitudinal direction of the first and second inner pipes and the first and second outer pipes are slidable relative to each other in a longitudinal direction of the first and second outer pipes.

In this manner, the first and second double pipes may be fit to each other such that the first and second inner pipes are slidable relative to each other in the longitudinal direction and the first and second outer pipes are slidable relative to each other in the longitudinal direction. This allows the longitudinal movement of the first double pipe relative to the second double pipe and the absorption of the thermal expansion caused by the oil temperature raise of each of the double pipes or the like.

As the first double pipe is allowed to move relative to the second double pipe in the longitudinal direction, the high-pressure oil and the low-pressure oil in the inner and outer passages causes hydraulic thrust in the direction to push the first double pipe toward the nacelle side. As a result, it is possible to reduce the load on the nacelle that has increased by supporting the first double pipe on the nacelle side, thereby reducing the load on the tower for the corresponding amount.

The above power generating apparatus of renewable energy type may further include an anti-pulsation accumulator which is installed between the hydraulic pump and the first double pipe in the nacelle and prevents a pulsation of the hydraulic pump.

In this manner, the distance between the anti-pulsation accumulator and the hydraulic pump is reduced by providing the anti-pulsation accumulator inside the nacelle, thereby preventing pulsation of the hydraulic pump effectively. The capacity of the anti-pulsation accumulator may be comparatively small and thus, can be housed inside the nacelle.

The above power generating apparatus of renewable energy type may further include a bypass passage which is installed between the second double pipe and the hydraulic motor and bypasses the hydraulic motor, a relief valve which is arranged near the base end part of the tower and installed in the bypass passage, and an oil cooler which is arranged near the base end part of the tower and installed on a downstream side of the relief valve.

In this manner, the relief valve is installed in the bypass passage and thus, when a pressure of the high-pressure oil fed from the hydraulic pump to the hydraulic motor exceeds the upper limit, the relief valve opens, causing the high-pressure oil to flow to the low-pressure oil passage side via the bypass valve and reducing the pressure of the high-pressure oil. In the process, the oil temperature increases due to friction at the relief valve and it is necessary to cool the oil by the oil cooler arranged on the downstream side of the relief valve. The relief valve and the oil cooler are installed near the base end part of the tower, which has plenty of space compared to the nacelle, thereby avoiding the nacelle being larger.

The above power generating apparatus of renewable energy type may further include a hydraulic accumulator which is arranged near the base end part of the tower and stores a hydraulic pressure of the high-pressure oil.

In the power generating apparatus of renewable energy type, it is occasionally necessary to accumulate hydraulic pressure of the high-pressure oil. For instance, in the wind turbine generator, it is performed occasionally to accumulate hydraulic pressure of the high-pressure oil so as to absorb the excess rotation energy in gusts, to accumulate hydraulic pressure of the high-pressure oil in advance to perform a ride-through function when voltage of the grid drops, and accumulate hydraulic pressure of the high-pressure oil to absorb excess rotation energy when there is output surplus of the wind turbine generator. It is necessary to provide a hydraulic accumulator that has sufficiently large capacity in order to perform the above accumulation of hydraulic pressure.

The hydraulic accumulator is arranged near the base end part of the tower, thereby allowing the hydraulic accumulator to have sufficiently large capacity. Therefore, the hydraulic accumulator can perform essential functions effectively.

In the above power generating apparatus of renewable energy type, the power generating apparatus of renewable energy type may be a wind turbine generator, the tower may extend upwardly from the base end part to the tip end part of the tower in a vertical direction, and the rotor blade may receive wind to rotate the main shaft. In such case, the hydraulic motor may be arranged near ground level or one of near sea level and below sea level.

Alternatively, the power generating apparatus of renewable energy type may be a power generating apparatus which generates power from tidal current, ocean current or river current and in which the tower extends downward in the vertical direction from the base end part to the tip end part in the sea or in the water, and the main shaft rotates by the tidal current, seal current or river current acting on the rotor blade.

Advantageous Effects of Invention

According to the present invention, the first double pipe supported to the nacelle side is connected rotatably to the second double pipe so that, even when the nacelle turns, the high-pressure oil and the low-pressure oil can flow between the hydraulic pump inside the nacelle and the hydraulic motor installed on the base end part of the tower via the first and second double pipes.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

Figure 1:
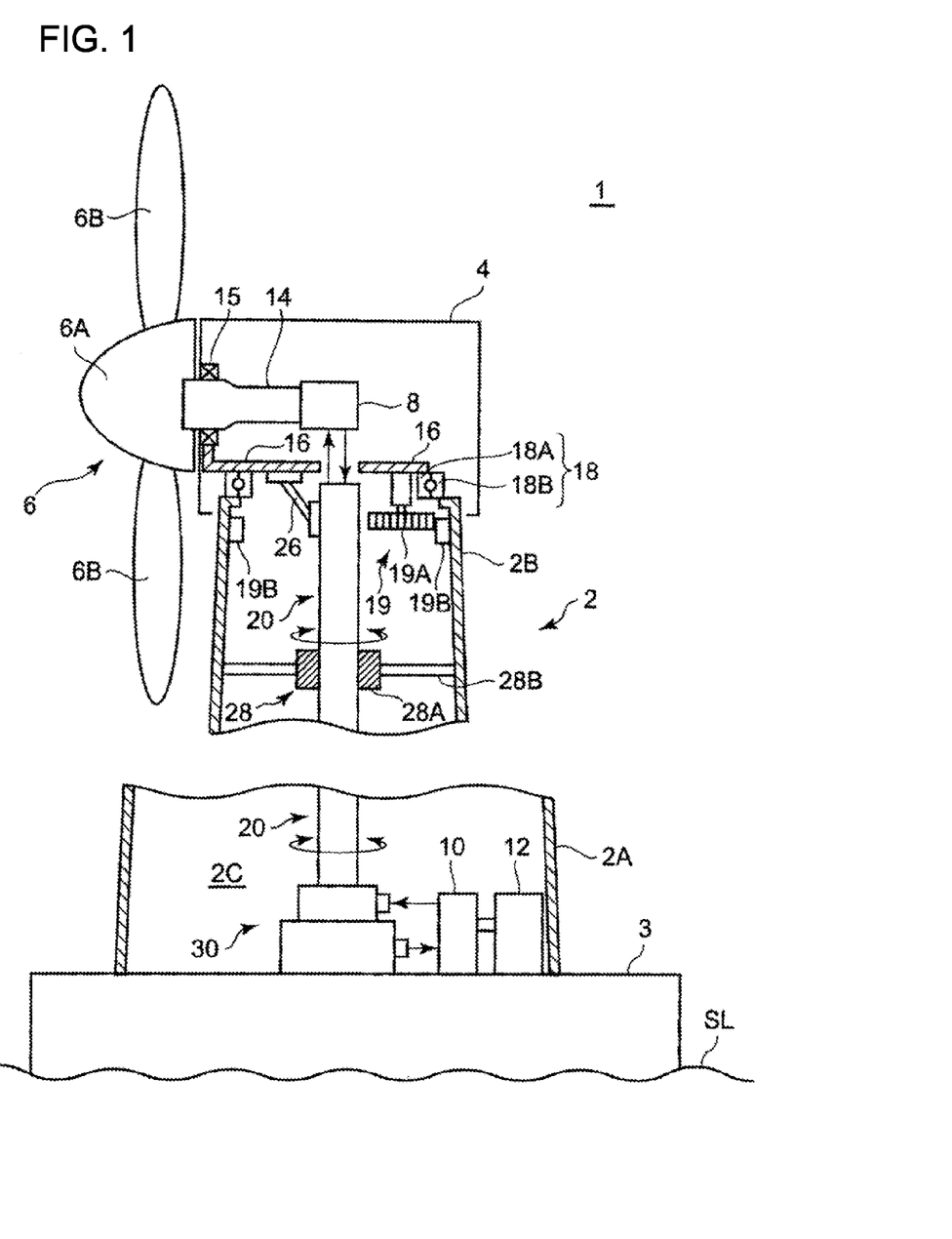
FIG. 1 is an exemplary structure of an entire wind turbine generator in relation to a first preferred embodiment.
Figure 2:
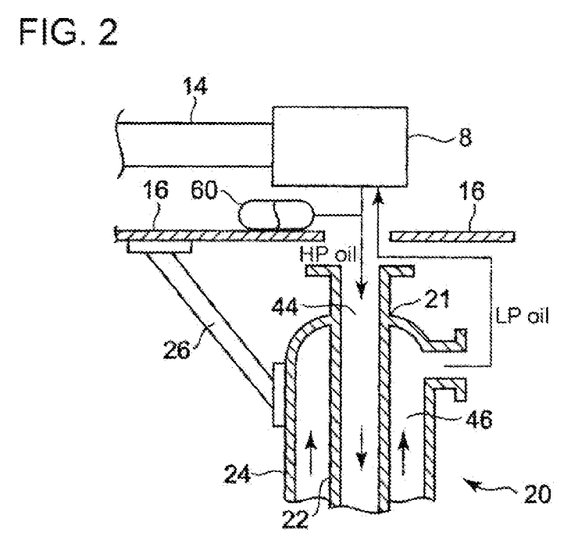
FIG. 2 is a sectional view showing a detailed structure of an end part of a first double pipe on a hydraulic pump side.
Figure 3:
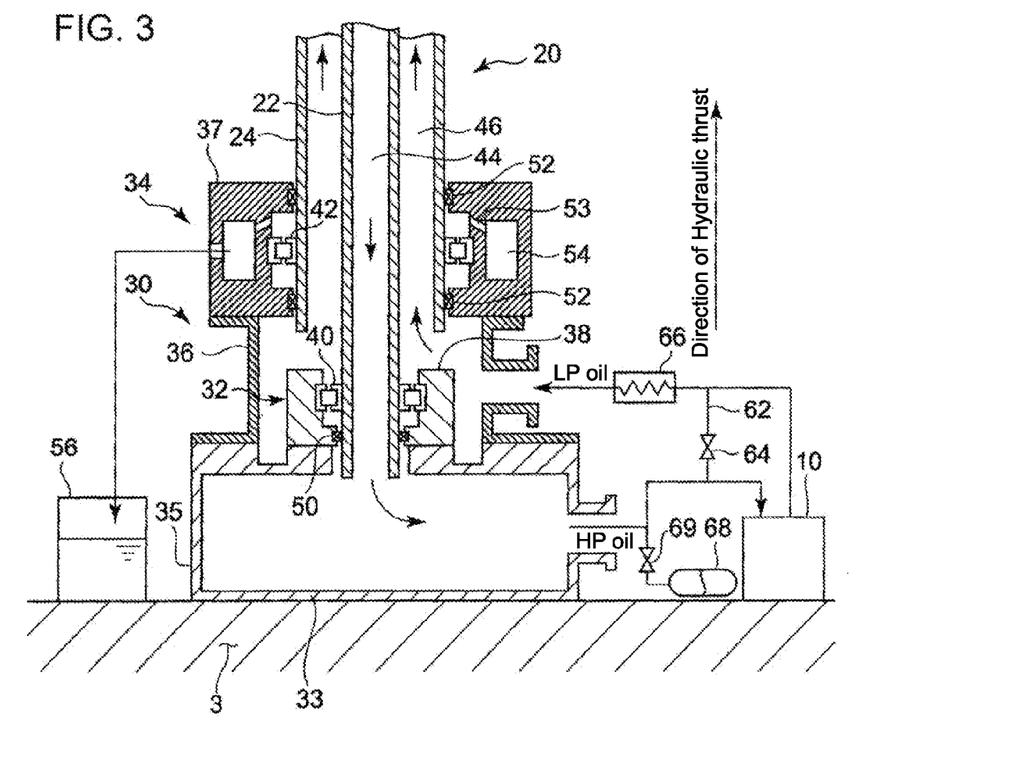
FIG. 3 is a sectional view showing a detailed structure of a connection part of the first and second double pipes in the first preferred embodiment.

A wind turbine generator is described as an example of the power generating apparatus of renewable energy type in a first preferred embodiment. FIG. 1 is a schematic view showing the wind turbine generator as a whole in relation to the first preferred embodiment. FIG. 2 is a sectional view showing a detailed structure of an end part of a first double pipe on a hydraulic pump side. FIG. 3 is a sectional view showing a detailed structure around a connection part of the first and second double pipes.

FIG. 1 shows the wind turbine generator 1 mainly composed of a tower 2, a nacelle installed on the tower 2, a rotor 6 rotated by the wind, a hydraulic pump 8, a hydraulic motor 10, and a generator 12 coupled to the hydraulic motor 10.

The tower 2 is installed on a base 3 which is located approximately at seal level, SL. The tower 2 extends in a vertical direction from a base end part 2A on a base 3 side to a tip end part 2B. A nacelle 4 is installed on the tip end part 2B of the tower 2. The nacelle 4 houses a main shaft 14 and the hydraulic pump 8 mounted to the main shaft. The main shaft 14 is rotatably supported on the nacelle 4 by a main shaft bearing 15.

The rotor 6 includes a hub 6A and a plurality of rotor blades 6B extending radially from the hub 6A. The hub 6A of the rotor 6 is coupled to the main shaft 14. Thus, when the rotor 6 receives the wind and is rotated by the wind, the main shaft 14 rotates with the hub 6A. Then, the rotation of the main shaft 14 is inputted to the hydraulic pump 8 to produce high-pressure oil in the hydraulic pump 8.

The hydraulic motor 10 is provided an internal space 2C at the base end part 2A of the tower 2 and installed on a base 3. The hydraulic motor 10 is driven by high-pressure oil supplied from the hydraulic pump 8 in the nacelle 4.

The generator 12 coupled to the hydraulic motor 10 is also provided in the internal space 2C at the base end part 2A and installed on the base 3, in the similar manner to the hydraulic motor 10.

The nacelle 4 has a nacelle bedplate 16. The nacelle bedplate 16 is supported turnably on the tip end part 2B of the tower by a nacelle bearing 18. Specifically, the nacelle bedplate 16 is fixed to an inner ring 18A of the nacelle bearing 18 and the tip end part 2B of the tower 2 is fixed to an outer ring 18B of the nacelle bearing 18.

A nacelle turning mechanism 19 is mounted to the nacelle bedplate 16. The nacelle turning mechanism 19 turns the nacelle bedplate 16 with respect to the tip end part 2B of the tower 2. The nacelle turning mechanism 19 may be formed by, for instance, a gear 19A meshing with an internal gear 19B provided on an inner periphery of the tip end part 2B of the tower 2 and a motor directly coupled to the gear 19A and rotating the gear 19A.

In the preferred embodiment, the hydraulic pump 8 housed in the nacelle 4 and the hydraulic motor 10 provided in the internal space 2C at the base part 2A of the tower 2 are connected by means of a first double pipe 20 and a second double pipe 30.

The first double pipe 20 extends downward approximately over the entire length of the tower 2 from the tip end part 2B to the based end part 2A of the tower. As shown in FIG. 2 and FIG. 2, the first double pipe 20 includes a first inner pipe 22 and a first outer pipe 24 provided on an outer periphery of the first inner pipe 22. The first inner pipe 22 and the first outer pipe 24 are joined together at an end on a side nearer to the nacelle 4 and are integrated by welding to form the first double pipe 20 (see 21 in FIG. 2). The first outer pipe 24 is supported on the nacelle bedplate 16 by a nacelle-side supporting mechanism 26. Thus, the first outer pipe 24 and the first inner pipe welded to the first outer pipe 24 turn together with the nacelle bedplate 16 when the nacelle 4 turns.

The first inner pipe 22 and the first outer pipe 24 are joined by welding in the preferred embodiment. However, this is not limitative and the first inner pipe 22 and the first outer pipe 24 may be joined by any method that can maintain liquid tightness, such as by a bolt with a sealing flange instead of welding.

The first double pipe 20 is arranged such that pipe centers of the first inner pipe 22 and the first outer pipe 24 are arranged concentrically with a rotation axis of the nacelle 4. Thus, even when the first double pipe 20 turns with the nacelle bedplate 16, the position of the first double pipe in the tower 2 stays the same.

From the perspective of preventing deformations of the first double pipe such as buckling and bending thereof, the first double pipe may be supported by a tower-side supporting mechanism 28 projecting from the inner periphery of the tower as shown in FIG. 1. The tower-side supporting mechanism 28 may include, for instance, a circular shoe 28A which is in contact with the outer periphery of the first outer pipe 24 and a plurality of supporting bars 28B which project inwardly in the radial direction of the first outer pipe 24 to support the shoe 28A.

In such case, preferably the inner periphery of the shoe 28A is made of low-friction material, or the shoe itself is formed by an elastic member, an elastic mechanism or the like so as to support the first outer pipe 24 rotatably and slidably in the longitudinal direction by means of the shoe 28A and the supporting bars 28B. Thus, the first double pipe 20 can be firmly supported without interfering with the rotation of the first double pipe 20 caused by the rotation of the nacelle 4 while absorbing thermal expansion of the first double pipe 20.

FIG. 3 shows the second double pipe 30 including a second inner pipe 32 and a second outer pipe 34 provided on the outer periphery of the second inner pipe 32. The second inner pipe 32 of the second double pipe 30 is in a shape of a container with a closed bottom 33 and installed on the base 3 on which the tower is installed upright.

The second double pipe 30 may be formed by a plurality of parts. In an exemplary case described in FIG. 3, the second double pipe 30 is formed by a lower part 35 forming an outer shape of the second double pipe 30, a middle part 36, an upper part 37 and a circular part 38 surrounded by the middle part 36. The lower part 35 has a large internal space with a closed bottom 33 and has a high-pressure oil discharge port on a side surface, which is connected to an intake side of the hydraulic motor. The middle part 36 is provided on the lower part 35 and has a low-pressure oil intake port on a side surface, which is connected to a discharge side of the hydraulic motor 10. The upper part 37 is provided on the middle part 36 and has a diameter slightly greater than that of the first outer pipe 24 of the first double pipe 20 so as to cover an outer periphery of a lower end part of the first outer pipe 24. The circular part 38 is provided on the lower part 35 and has a diameter slightly greater than that of the first inner pipe 22 of the first double pipe 20 so as to cover an outer periphery of a lower end part of the first inner pipe 22.

In the second double pipe 30, the circular part 38 mainly constitutes the second inner pipe 32, whereas the middle part 36 and the upper part 37 mainly constitute the second outer pipe 34.

The first double pipe 20 is rotatably connected to the second double pipe 30 as described above. Specifically, an inner bearing 40 is provided between the first inner pipe 22 of the first double pipe 20 and the second inner pipe 32 of the second double pipe 30. The first inner pipe 22 is supported rotatably to the second inner pipe 32 by the inner bearing 40. An outer bearing 42 is provided between the first outer pipe 24 of the first double pipe 20 and the second outer pipe 34 of the second double pipe 30. The first outer pipe 24 is supported rotatably to the second outer pipe 34 by the outer bearing 42.

From the perspective of absorbing thermal expansion of the first double pipe 20 and the second double pipe 30 (specifically, a thermal expansion difference between the tower 2 and each of the first and second double pipes 20 and 30), the first double pipe 20 is connected to the second double pipe 30 slidably in the longitudinal direction. In such case, an outer race of the inner bearing 40 is fixed to the second inner pipe 32 and an inner race of the inner bearing 40 is arranged slidably in the longitudinal direction of the pipe with respect to the first inner pipe 32. In the similar manner, an outer race of the outer bearing 42 is fixed to the second outer pipe 34 and an inner race of the outer bearing 42 is arranged slidingly in the longitudinal direction with respect to the first outer pipe 24. Further, a size of each part of the first double pipe 20 and the second double pipe 30 is preferably determined so that there is no clogging in an inner passage 44 and an outer passage 46 even within an assumed range of thermal expansion of the first double pipe 20 even when the first double pipe 20 slides relative to the second double pipe 30 in the longitudinal direction.

As the first double pipe 20 is allowed to move relative to the second double pipe 30 in the longitudinal direction, high-pressure oil and low-pressure oil flowing in the first and second double pipes 20 and 30 generates hydraulic thrust (the force along the direction of the hydraulic thrust in FIG. 3) which pushes the first double pipe 20 toward the nacelle 4. Therefore, it is possible to reduce the load of the nacelle 4 which is increased by supporting the first double pipe 20 on the nacelle side. And for the corresponding amount, the load on the tower 2 is reduced as well.

The first and second double pipes 20 and 30 connected in the above manner, form the inner passage 44 in which high-pressure oil supplied from the hydraulic pump 8 flows and the outer passage 46 in which low-pressure oil discharged from the hydraulic motor 10 flows.

Specifically, the inner passage 44 in which the high-pressure oil flows is formed by the first inner pipe 22 of the first double pipe 20 and the second inner pipe 32 of the second double pipe 30. The outer passage in which the low-pressure oil flows is formed by the first outer pipe 24 of the first double pipe 20 and the second outer pipe 34 of the second double pipe 30.

In this manner, the high-pressure oil is introduced into the inner passage 44 and the low-pressure oil is introduced into the outer passage 46 so that, even when the high-pressure oil of the inner passage 44 leaks due to corrosion or breakage of the inner passage 44, the leaked high-pressure oil is captured in the outer passage 46. Thus, it is possible to prevent outside leakage of the high-pressure oil.

An inner seal is provided between an outer wall surface of the first inner pipe 22 and an inner wall surface of the second inner pipe 32. The inner seal 50 is interposed between the inner passage 44 and the outer passage 46. That is, the inner seal 50 is surrounded by the inner passage 44 and the outer passage 46. Therefore, even when the inner seal 50 functions poorly, the high-pressure oil flowing in the inner passage 44 leaks to the outer passage 46, thereby preventing the outside leakage of the high-pressure oil.

A pair of outer seals 52 are provided between an outer wall surface of the first outer pipe 24 and an inner wall surface of the second outer pipe 34. An oil storage part 54 is in communication with a space between the pair of outer seals 52 via a communication passage 53. The oil storage part 54 is connected to an atmospheric pressure tank 56.

This allows the low-pressure oil leaking from the outer passage 46 to flow into the atmospheric pressure tank 56 via the communication passage 53 and the oil storage part 54 even when the outer seal 52 functions poorly. Specifically, the low-pressure oil leaked from the outer passage 46 is recovered by the atmospheric pressure tank 56 once the pressure is sufficiently reduced, thereby preventing outside leakage of the low-pressure oil.

From the perspective of damping pulsation of the hydraulic pump 8, an anti-pulsation accumulator is provided between the hydraulic pump 8 and the first double pipe 20 inside the nacelle 4. For instance, as shown in FIG. 2, the anti-pulsation accumulator 60 may be installed on the nacelle bedplate 16.

In this manner, the distance between the anti-pulsation accumulator 60 and the hydraulic pump 8 is reduced by providing the anti-pulsation accumulator 60 inside the nacelle 4, thereby preventing pulsation of the hydraulic pump 8 effectively. The capacity of the anti-pulsation accumulator 60 may be comparatively small and thus, can be housed inside the nacelle 4. Particularly, in the preferred embodiment, the hydraulic motor 10 and the generator 12 are installed in the internal space 2C at the base end part of the tower 2 instead of inside the nacelle. Thus, a plenty of space for installing the anti-pulsation accumulator can be secured in the nacelle 4.

Preferably, a bypass passage 62, a relief valve 64, an oil cooler 66 and a hydraulic accumulator 68 are preferably arranged in the internal space 2C of the tower, which has plenty of space compared to the nacelle 4.

The bypass passage 62 is arranged between the second double pipe 30 and the hydraulic motor 10 and bypasses the hydraulic motor 10. The relief valve 64 is arranged in the bypass passage 62. The relief valve 64 opens when pressure of the high-pressure oil from the hydraulic pump 8 to the hydraulic motor 10 exceeds an upper limit, thereby introducing the high-pressure oil to the low-pressure oil passage via the bypass passage 62 and suppressing the pressure of the high-pressure oil. The oil cooler 66 is installed on a downstream side of the relief valve 64, i.e. on a downstream side of a merging section where the bypass passage 62 and the low-pressure oil passage meet). The oil cooler 66 reduces an oil temperature when the high-pressure oil passes the relief valve 64 and raises the temperature, and also cools the low-pressure oil in a normal state (when the relief valve 64 is inactive).

The hydraulic accumulator 68 has a capacity that is much larger than the anti-pulsation accumulator 60. The hydraulic accumulator 68 is used to, for instance, accumulate hydraulic pressure of the high-pressure oil to absorb excess rotation energy in gusts, accumulate hydraulic pressure of the high-pressure oil in advance to perform a ride-through function when voltage of the grid drops, and accumulate hydraulic pressure of the high-pressure oil to absorb excess rotation energy when there is output surplus of the wind turbine generator 1. The hydraulic accumulator 68 may be installed in the internal space 2C at the base end part 2A of the tower 2 so that the capacity of the hydraulic accumulator 68 can be sufficiently large. The hydraulic accumulator 68 stores the hydraulic pressure of the high-pressure oil by opening and closing the accumulator valve 69.

According to the wind turbine generator 1 with the above structure, the first double pipe 20 supported on the nacelle side is connected rotatably to the second double pipe 30 so that, when the nacelle 4 turns, the high-pressure oil and the low-pressure oil can flow between the hydraulic pump 8 inside the nacelle 4 and the hydraulic motor 10 installed on the base end part 2A of the tower via the first and second double pipes 20 and 30.

FIG. 1 through FIG. 3 show an example where the first double pipe 20 is connected rotatably to the second double pipe 30 by means of the inner bearing 40 and the outer bearing 42. However, this does not limit a method of connecting the first and second double pipes 20 and 30 and the first and second double pipes 20 and 30 may be connected without the inner bearing 40 and the outer bearing 42.

Figure 4:
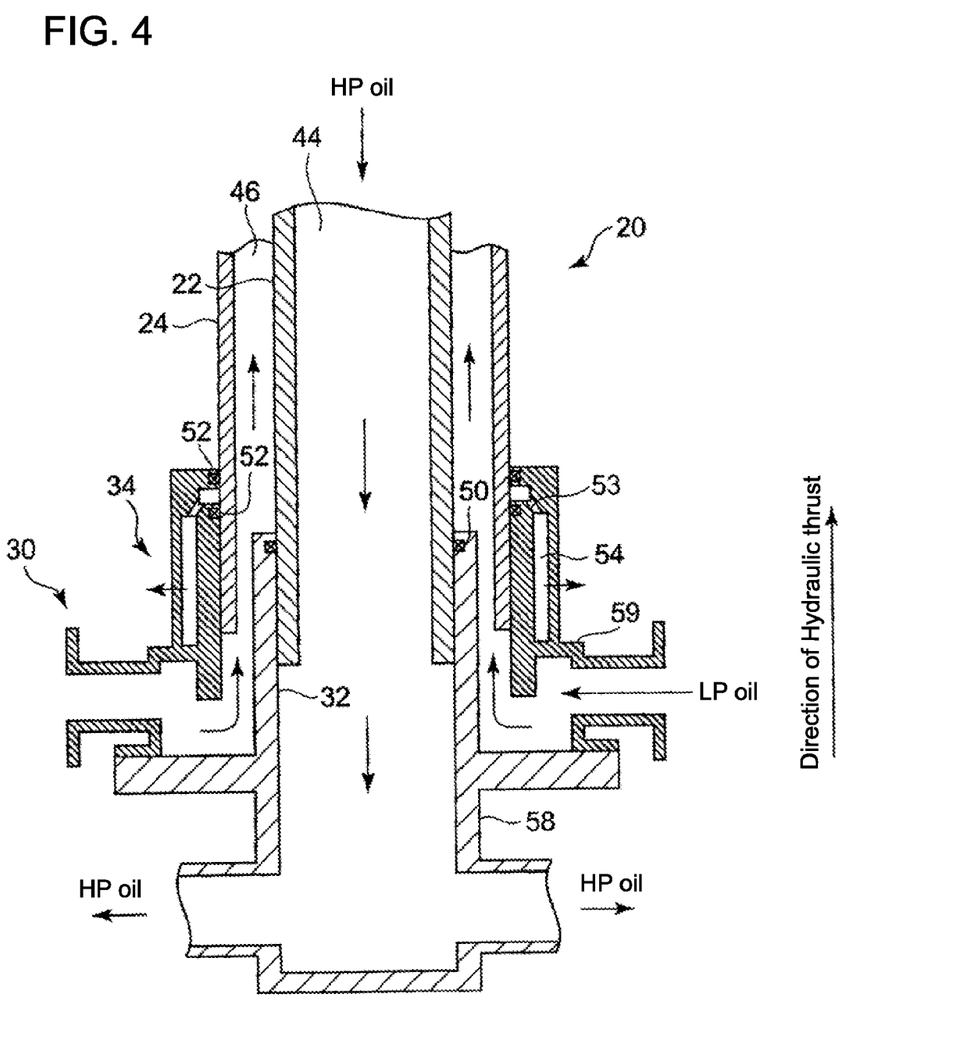
FIG. 4 is a sectional view showing a connection part of the first and second double pipes, different from the connection part of FIG. 3.

Another exemplary embodiment of connecting the first and second double pipes 20 and 30 are illustrated in FIG. 4. As shown in the figure, the first double pipe 20 may be rotatably fitted to the second double pipe 30. FIG. 4 shows the outer wall surface of the first inner pipe 22 and the inner wall surface of the second inner pipe 32 slidingly contacting each other such as to slide relative to each other in a rotational direction. In a similar manner, the outer wall surface of the first outer pipe 24 and the inner wall surface of the second outer pipe 34 slidingly contact each other such as to slide relative to each other in the rotational direction.

In such case, when the first inner pipe 22 is slidable relative to the second inner pipe 32 in the longitudinal direction of the pipes 22 and 23 and the first outer pipe 24 is slidable relative to the second outer pipe 34 in the longitudinal direction of the pipes 24 and 34, the longitudinal movement of the first double pipe 20 relative to the second double pipe 30 is allowed. As a result, it is possible to absorb thermal expansion of the first and second double pipes 20 and 30, i.e. a thermal expansion difference between the tower 2 and each of the first and second double pipes 20 and 30 and to reduce the load on the nacelle 4 by generating hydraulic thrust that pushes the first double pipe 20 to the nacelle side (the force along the direction of the hydraulic thrust in FIG. 4), thereby reducing the load on the tower 2 for the corresponding amount.

Herein, the size of each part of the first double pipe 20 and the second double pipe 30 is preferably determined so that there is no clogging in the inner passage 44 and the outer passage 46 even within an assumed range of thermal expansion of the first double pipe 20 even when the first double pipe 20 slides relative to the second double pipe 30 in the longitudinal direction.

FIG. 4 shows the second double pipe 30 having a lower part 58 and an upper part 59. The lower part 58 has a high-pressure oil discharge port on a side surface, which is connected to an intake side of the hydraulic motor. A top part of the lower part 58 is formed into a tube shape having a diameter slightly greater than that of the first inner pipe 22 to cover the outer periphery of a lower end part of the first inner pipe 22. The upper part 59 is arranged on the lower part 58 and has a low-pressure oil intake port on a side surface, which is connected to an intake side of the hydraulic motor 10. The top part of the upper part 59 has a diameter that is slightly larger than that of the first outer pipe 24 of the first double pipe 20 such as to cover the outer periphery of a lower end part of the first outer pipe 24.

In a manner similar to the example of FIG. 3, the inner seal 50 is provided between the outer surface wall of the first inner pipe 22 and the inner wall surface of the second inner pipe 32. Further, a pair of outer seals 52 are provided between the outer wall surface of the first outer pipe 24 and the inner wall surface of the second outer pipe 34 which seal a gap between a pipe wall surface of the first outer pipe and a pipe wall surface of the second outer pipe 34. The oil storage part 54 is in communication with a space between the pair of outer seals 52 via the communication passage 53. The oil storage part 54 is connected to the atmospheric pressure tank 56 (see FIG. 3).

Further, the second double pipe 30 may be installed on the base 3 as shown in FIG. 1 and FIG. 3, or may be supported on the base 3 or the inner periphery of the base end part 2A of the tower.

Second Preferred Embodiment

Figure 5:
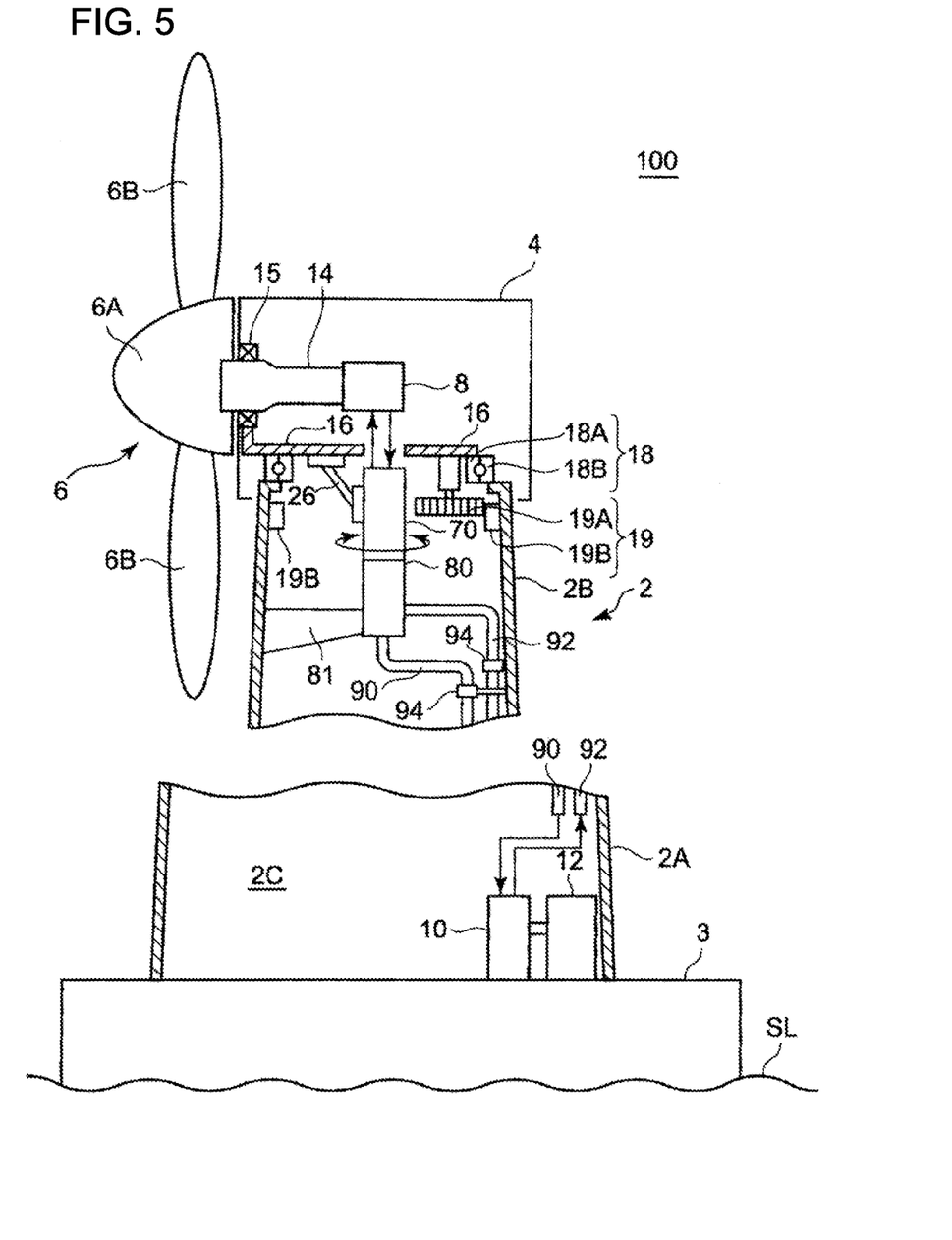
FIG. 5 is an exemplary structure of an entire wind turbine generator in relation to a second preferred embodiment.

In a second preferred embodiment, an exemplary embodiment different from the first preferred embodiment is explained. FIG. 5 shows an exemplary structure of the entire wind turbine generator 1 in relation to the second preferred embodiment.

The wind turbine generator in relation to the second preferred embodiment is similar to the wind turbine generator 1 of the first preferred embodiment except for the structure of the first and second double pipes. In the preferred embodiment, components different from the first preferred embodiment are explained and the components described in the wind turbine generator 1 are denoted by the same reference numerals in FIG. 5, and thus detailed description thereof is hereinafter omitted.

In the wind turbine generator 100 in relation to the second preferred embodiment, a first double pipe 70 and a second double pipe 80 are provided between the hydraulic pump 8 inside the nacelle 4 and the hydraulic motor 10 provided in the internal space 2C at the base end part 2A of the tower 2.

The first double pipe 70 is provided in a part of the tower 2 (just beneath the nacelle 4). The first double pipe 70 is supported to the nacelle bedplate 16 by the nacelle-side supporting mechanism 26 so as to turn with the nacelle bedplate 16 when the nacelle 4 turns.

The second double pipe 80 is provided below the first double pipe 70 and supported rigidly by the tower-side supporting mechanism 81 projecting from the inner periphery of the tower 2. The second double pipe 80 and the hydraulic motor 10 are connected via a high-pressure oil pipe 90 in which the high-pressure oil flows and a low-pressure oil pipe 92 in which the low-pressure oil flows. The high-pressure oil pipe 90 and the low-pressure oil pipe 92 may be any one of rigid pipes, flexible tubes (hoses) and rigid pipes fixed in the rotational direction with accordion joints that absorbs thermal expansion in the longitudinal direction.

The high-pressure oil pipe 90 and the low-pressure oil pipe 92 are supported to the inner periphery of the tower such as to allow thermal expansion of each pipe. For instance, shoes 94 having a shape of a circular ring that is fixed to the inner periphery of the tower 2 may support the high-pressure oil pipe 90 and the low-pressure oil pipe 92 by contacting the inner periphery of the shoe 94 with the outer periphery of each of the pipes 90 and 92. In such case, each of the high-pressure oil pipe 90 and the low-pressure oil pipe 92 may be slidably supported in the longitudinal direction by each of the shoes 94 by making the inner periphery of the shoes 94 out of low-friction material.

Figure 6:
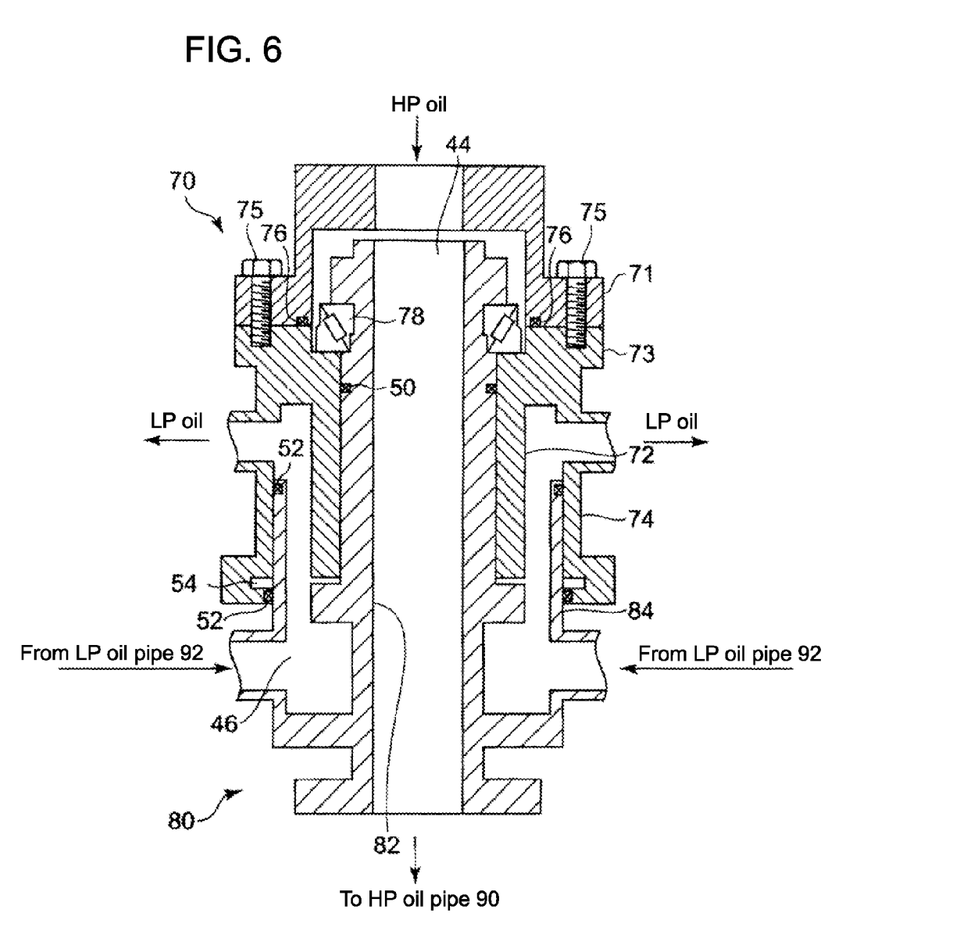
FIG. 6 is a sectional view showing a detailed structure of the first and second double pipes in the second preferred embodiment.

FIG. 6 is a sectional view showing a detailed structure of the first and second double pipes 70. FIG. 6 shows the first double pipe 70 constituted of an upper part 71 and a lower part 73. The upper part 71 and the lower part 73 are fixed to each other by a bolt 75 at a flange part. Further, a seal 76 is provided on a contact surface of the upper part 71 and the lower part 73 to maintain liquid tightness. The upper part 71 has a high-pressure oil intake port at a top part thereof, that is connected to the discharge side of the hydraulic pump 8. The lower part 73 includes an inner-circumferential cylindrical part and an outer-circumferential cylindrical part that extend downward from the flange part where the lower part 73 and the upper part 71 are joined. The lower part 73 has a low-pressure oil discharge port on a side surface of the outer circumferential cylindrical part. The low-pressure discharge port is connected to the intake side of the hydraulic pump 8.

The first inner pipe 72 of the first double pipe 70 is formed by the upper part 71 and a part of the lower part 73 (the inner-circumferential cylindrical part). The first outer pipe 74 of the first double pipe 70 is formed by a part of the lower part 73 (the outer-circumferential cylindrical part).

The second double pipe 80 includes a second inner pipe 82 and a second outer pipe 84 provided on the outer periphery of the second inner pipe 82. The second double pipe 80 has a high-pressure oil discharge port at a bottom part thereof. The high-pressure oil discharge port is connected to the high-pressure oil pipe 90 (see FIG. 5). The second double pipe 80 also has a low-pressure oil intake port on a side surface thereof, that is connected to the low-pressure oil pipe 92 (see FIG. 5).

The first double pipe 70 is rotatably fitted to the second double pipe 80. Specifically, an inner wall surface of the first inner pipe 72 and an outer wall surface of the second inner pipe 82 slidingly contact each other so as to slide relative to each other in the rotational direction. In a similar manner, the inner wall surface of the first outer pipe 74 and the outer wall surface of the second outer pipe 84 slidingly contact each other such as to slide relative to each other in the rotational direction.

The first and second double pipes 70 and 80 connected in the above manner, form the inner passage 44 in which high-pressure oil supplied from the hydraulic pump 8 flows and the outer passage 46 in which low-pressure oil discharged from the hydraulic motor 10 flows. It is possible to prevent outside leakage of the high-pressure oil by feeding the high-pressure oil in the inner passage 44 and the low-pressure oil in the outer passage 46.

The inner seal 50 is provided between the inner wall surface of the first inner pipe 72 and the outer wall surface of the second inner pipe 82. The pair of outer seals 52 are provided between the inner wall surface of the first outer pipe 74 and the outer wall surface of the second outer pipe 84. The oil storage part 54 is provided in communication with a space between the pair of outer seals 52. The oil storage part 54 is connected to the atmospheric pressure tank 56 (see FIG. 3).

A tapered roller bearing 78 is provided between the inner wall surface of the first inner pipe 72 and the outer wall surface of the second inner wall pipe 82. The tapered roller bearing 78 supports the first inner pipe 72 to the second inner pipe 82 so that the first double pipe 70 does not move relative to the second double pipe 80 in the longitudinal direction. The tapered roller bearing 78 can receive both a longitudinal thrust load along the longitudinal direction and a radial load along the radial direction of the first and second double pipe 70 and 80. The thrust load may include a hydraulic thrust that is generated by the high-pressure oil and the low-pressure oil that flows in the inner and outer passages 44 and 46. The first and second inner pipes 72 and 82 thermally expand respectively without restrictions from a base point where the tapered roller bearing 78 is installed. Thus, even when a section where the first and second inner pipes 72 and 82 overlap is long, it is not affected by the thermal expansion.

According to the wind turbine generator 100 with the above structure, the first double pipe 70 supported on the nacelle side is rotatably connected to the second double pipe 80 so that, even when the nacelle 4 turns, the high-pressure oil and the low-pressure oil can flow between the hydraulic pump 8 inside the nacelle 4 and the hydraulic motor 10 installed on the base end part 2A of the tower via the first and second double pipes 70 and 80.

FIG. 5 shows the case where the first double pipe 70 is installed just beneath the nacelle 4. However, this is not limitative and the first double pipe 70 may extend from the nacelle side to any position in the tower 2.

FIG. 6 shows the case where the tapered roller bearing 78 is provided between the inner wall surface of the first inner pipe 72 and the outer wall surface of the second inner pipe 82. However, this is not limitative and the tapered roller bearing 78 may be omitted.

FIG. 7 is a sectional view showing another detailed structure of the first and second double pipes 70 and 80. In the exemplary case shown in the figure, the first double pipe 70 is rotatably fitted to the second double pipe 80 so that the first double pipe 70 can slide relative to the second double pipe 80 in the longitudinal direction. Specifically, the first inner pipe 72 is slidable relative to the second inner pipe 82 in the longitudinal direction and the first outer pipe 74 is slidable relative to the second outer pipe 84 in the longitudinal direction. In this manner, the longitudinal movement of the first double pipe 70 relative to the second double pipe 80 is allowed so as to absorb thermal expansion of the first and second double pipes 70 and 80 and also to reduce the load on the nacelle 4 by generating the hydraulic thrust that pushes the first double pipe 80 toward the nacelle side.

Further, the size of each part of the first double pipe 70 and the second double pipe 80 is preferably determined so that there is no clogging in the inner passage 44 and the outer passage 46 or interference of the parts even within an assumed range of thermal expansion of the first and second double pipes 70 and 80 when the first double pipe 70 slides relative to the second double pipe 80 in the longitudinal direction.

While the present invention has been described with reference to exemplary embodiments, it is obvious to those skilled in the art that various changes may be made without departing from the scope of the invention.

Particularly, in the preferred embodiments, the case where the hydraulic motor 10 is installed on the base 3 approximately at seal level SL is explained. However, this is not limitative and the hydraulic motor 10 may be installed at any level as long as it is near the base end part of the tower, such as near the ground level and at a bottom part of the tower (a part of the tower under the sea) below the sea level SL in a offshore wind turbine generator of floating type. Herein, "near the base end part of the tower" includes the tower and outside of the tower as well.

In the above-preferred embodiments, the wind turbine generators 1 and 100 are used as illustrative embodiments of the power generating apparatus of renewable energy type. However, this is not limitative and the present invention is also applicable to power generating apparatuses of renewable energy type other than the wind turbine generator.

For instance, the present invention may be applied to a power generating apparatus which generates power from tidal current, ocean current or river current and in which the tower extends downward in the vertical direction from the base end part to the tip end part in the sea or in the water, and the main shaft rotates by the tidal current, seal current or river current acting on the rotor blade.

The invention claimed is:

1. A power generating apparatus of renewable energy type, comprising:
    a tower;
    a nacelle which is installed on a tip end part of the tower;
    a main shaft which is housed in the nacelle and rotates with rotor blades;
    a hydraulic pump which is housed in the nacelle and installed to the main shaft;
    a hydraulic motor which is arranged near a base end part of the tower and is driven by pressurized oil supplied from the hydraulic pump;
    a generator which is connected to the hydraulic motor;
    a first double pipe which comprises a first inner pipe and a first outer pipe and is supported on a side of the nacelle and extends inside the tower toward the base end part of the tower, the first inner pipe and the first outer pipe being connected to the hydraulic pump; and
    a second double pipe which comprises a second inner pipe and a second outer pipe and is arranged farther from the nacelle than the first double pipe and fit in the first double pipe, the second inner pipe and the second outer pipe being connected to the hydraulic motor;
    an inner bearing which is provided between the first inner pipe and the second inner pipe and supports the first inner pipe rotatably to the second inner pipe;
    an outer bearing which is provided between the first outer pipe and the second outer pipe and supports the first outer pipe rotatably to the second outer pipe, wherein
    the first and second inner pipes communicate with each other to form an inner passage,
    the first and second outer pipes communicate with each other to form an outer passage,
    high-pressure oil discharged from the hydraulic pump flows in one of the inner passage and the outer passage and is supplied to the hydraulic motor,
    low-pressure oil discharged from the hydraulic motor flows in the other of the inner passage and the outer passage and returns to the hydraulic pump, and
    the first double pipe supported on the nacelle side is connected rotatably to the second double pipe, wherein
    the inner bearing is slidable relative to the first inner pipe in a longitudinal direction of the first inner pipe, and
    the outer bears in slidable relative to the first outer pipe in a longitudinal direction of the first outer pipe.

2. The power generating apparatus of renewable energy type according to claim 1,
    wherein the first inner pipe and the first outer pipe are joined together at an end on a side nearer to the nacelle and are integrated to form the first double pipe.

3. The power generating apparatus of renewable energy type according to claim 1,
    wherein the high-pressure oil flows in the inner passage and the low-pressure oil flows in the outer passage.

4. The power generating apparatus of renewable energy type according to claim 3, further comprising:
    an inner seal which seals a gap between a pipe wall surface of the first inner pipe and a pipe wall surface of the second inner pipe,
    wherein the inner seal is arranged so as to be interposed between the inner passage and the outer passage.

5. The power generating apparatus of renewable energy type according to claim 3, further comprising:
    a pair of outer seals which seal a gap between a pipe wall surface of the first outer pipe and a pipe wall surface of the second outer pipe;

an oil storage part which is in communication with a space between the pair of outer seals; and a tank which is in communication with the oil storage part.

6. The power generating apparatus of renewable energy type according to claim 1, wherein the first double pipe extends approximately over the entire length of the tower from the nacelle side to the base end part of the tower, and wherein the second double pipe is supported near the base end part of the tower.

7. The power generating apparatus of renewable energy type according to claim 6, wherein the second double pipe is shaped into a container with a closed bottom and installed on a base where the tower is installed upright.

8. The power generating apparatus of renewable energy type according to claim 6, further comprising a supporting member which is fixed to an inner periphery of the tower and is in contact with an outer periphery of the first outer pipe of the first double pipe from outside in a radial direction of the first double pipe, wherein the supporting member supports the first double pipe rotatably and slidably in the longitudinal direction.

9. The power generating apparatus of renewable energy type according to claim 1, further comprising:

an anti-pulsation accumulator which is installed between the hydraulic pump and the first double pipe in the nacelle and prevents a pulsation of the hydraulic pump.

10. The power generating apparatus of renewable energy type according to claim 1, further comprising:

a bypass passage which is installed between the second double pipe and the hydraulic motor and bypasses the hydraulic motor;

a relief valve which is arranged near the base end part of the tower and installed in the bypass passage; and an oil cooler which is arranged near the base end part of the tower and installed on a downstream side of the relief valve.

11. The power generating apparatus of renewable energy type according to claim 1, further comprising:

a hydraulic accumulator which is arranged near the base end part of the tower and stores a hydraulic pressure of the high-pressure oil.

12. The power generating apparatus of renewable energy type according to claim 1, wherein the power generating apparatus of renewable energy type is a wind turbine generator, wherein the tower extends upwardly from the base end part to the tip end part of the tower in a vertical direction, and wherein the rotor blade receives wind to rotate the main shaft.

13. The power generating apparatus of renewable energy type according to claim 12, wherein the hydraulic motor is arranged near ground level.

14. The power generating apparatus of renewable energy type according to claim 12, wherein the hydraulic motor is arranged one of near sea level and below sea level.

15. The power generating apparatus of renewable energy type according to claim 1, wherein the inner bearing includes a first outer race fixed to an inner surface of the second inner pipe and a first inner race slidably abutting an outer surface of the first inner pipe so that the inner bearing is slidable relative to the first inner pipe in the longitudinal direction, and wherein the outer bearing includes a second outer race fixed to an inner surface of the second outer pipe and a second inner race slidably abutting an outer surface of the first outer pipe so that the outer bearing is slidable relative to the first outer pipe in the longitudinal direction.

16. A power generating apparatus of renewable energy type, comprising:

a tower;

a nacelle which is installed on a tip end part of the tower;

a main shaft which is housed in the nacelle and rotates with rotor blades;

a hydraulic pump which is housed in the nacelle and installed to the main shaft;

a hydraulic motor which is arranged near a base end part of the tower and is driven by pressurized oil supplied from the hydraulic pump;

a generator which is connected to the hydraulic motor;

a first double pipe which comprises a first inner pipe and a first outer pipe and is supported on a side of the nacelle and extends inside the tower toward the base end part of the tower, the first inner pipe and the first outer pipe being connected to the hydraulic pump; and a second double pipe which comprises a second inner pipe and a second outer pipe and is arranged farther from the nacelle than the first double pipe and fit in the first double pipe, the second inner pipe and the second outer pipe being connected to the hydraulic motor, wherein the first and second inner pipes communicate with each other to form an inner passage, the first and second outer pipes communicate with each other to form an outer passage, high-pressure oil discharged from the hydraulic pump flows in one of the inner passage and the outer passage and is supplied to the hydraulic motor, low-pressure oil discharged from the hydraulic motor flows in the other of the inner passage and the outer passage and returns to the hydraulic pump, and the first double pipe supported on the nacelle side is connected rotatably to the second double pipe, wherein the first double pipe is rotatably fit to the second double pipe, and wherein the first inner pipe slidably abuts the second inner pipe so that the first and second inner pipes are slidable relative to each other in a longitudinal direction of the first and second inner pipes, and the first outer pipe slidably abuts the second outer pipe so that the first and second outer pipes are slidable relative to each other in a longitudinal direction of the first and second outer pipes.

17. A power generating apparatus of renewable energy type, comprising:

a tower;

a nacelle which is installed on a tip end part of the tower;

a main shaft which is housed in the nacelle and rotates with rotor blades;

a hydraulic pump which is housed in the nacelle and installed to the main shaft;

a hydraulic motor which is arranged near a base end part of the tower and is driven by pressurized oil supplied from the hydraulic pump;

a generator which is connected to the hydraulic motor;

a first double pipe which comprises a first inner pipe and a first outer pipe and is supported on a side of the nacelle and extends inside the tower toward the base end part of the tower, the first inner pipe and the first outer pipe being connected to the hydraulic pump; and a second double pipe which comprises a second inner pipe and a second outer pipe and is arranged farther from the nacelle than the first double pipe and fit in the first double pipe, the second inner pipe and the second outer pipe being connected to the hydraulic motor;

a thrust bearing which supports the first double pipe rotatably to the second double pipe and receives a thrust load along the longitudinal direction of the first and second double pipes, wherein the first and second inner pipes communicate with each other to form an inner passage, the first and second outer pipes communicate with each other to form an outer passage, high-pressure oil discharged from the hydraulic pump flows in one of the inner passage and the outer passage and is supplied to the hydraulic motor, low-pressure oil discharged from the hydraulic motor flows in the other of the inner passage and the outer passage and returns to the hydraulic pump, and the first double pipe supported on the nacelle side is connected rotatably to the second double pipe, and wherein the thrust bearing is a tapered roller bearing which receives a radial load along a radial direction of the first and second double pipes in addition to the thrust load.

18. The power generating apparatus of renewable energy type according to claim 17, wherein the first double pipe extends partway through the tower from the nacelle side, and wherein the second double pipe is supported to the tower.

19. The power generating apparatus of renewable energy type according to claim 18, wherein the first and second double pipes are fit to each other such that the first and second inner pipes are slidable relative to each other in a longitudinal direction of the first and second inner pipes and the first and second outer pipes are slidable relative to each other in a longitudinal direction of the first and second outer pipes.

* * * * *